(12) United States Patent
Yui

(10) Patent No.: US 6,493,008 B1
(45) Date of Patent: Dec. 10, 2002

(54) MULTI-SCREEN DISPLAY SYSTEM AND METHOD

(75) Inventor: Hideaki Yui, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/505,044

(22) Filed: Feb. 16, 2000

(30) Foreign Application Priority Data

Feb. 19, 1999 (JP) ............................................ 11-041528
Dec. 27, 1999 (JP) ............................................ 11-371430

(51) Int. Cl.⁷ ................................................. G09G 5/08
(52) U.S. Cl. ...................................... 345/840; 345/145
(58) Field of Search ................................ 345/145, 146, 345/157, 807, 856, 840, 841

(56) References Cited

U.S. PATENT DOCUMENTS 5,548,304 A * 8/1996 Yoshino et al. ............. 345/145
5,694,150 A * 12/1997 Sigona et al. ................ 345/145
6,236,389 B1 * 5/2001 Imaizumi et al. ........... 345/145

\* cited by examiner

*Primary Examiner*—Cao H. Nguyen
(74) *Attorney, Agent, or Firm*—Rossi & Associates

(57) ABSTRACT

This invention provides a multi-screen display system, which unifies the control relating to each image on a multi-screen. The multi-screen display system receives images from a plurality of image sources, and displays the received images at the same time on the multi-screen of a display device. In the multi-screen display system, a multi-screen control part determines a type of each image source and a display region where a multi-screen control cursor is positioned on the multi-screen. The multi-screen control part determines a role of the multi-screen control cursor in the display region according to the type of the image source of an image displayed in the display region where the multi-screen control cursor is positioned. The multi-screen control part controls generation of the multi-screen control cursor and the operation thereof so that the multi-screen control cursor can play the determined role.

24 Claims, 15 Drawing Sheets

FIG.8

| REGION NUMBER | STARTING POINT COORDINATES | ENDING POINT COORDINATES | TYPE |
|---|---|---|---|
| 0 | (x0,y0) | (x2,y1) | PC |
| 1 | (x0,y1) | (x1,y2) | PC |
| 2 | (x1,y1) | (x4,y3) | DTV |
| 3 | (x3,y3) | (x4,y4) | DTV |
| 4 | (x1,y3) | (x3,y5) | OSD |

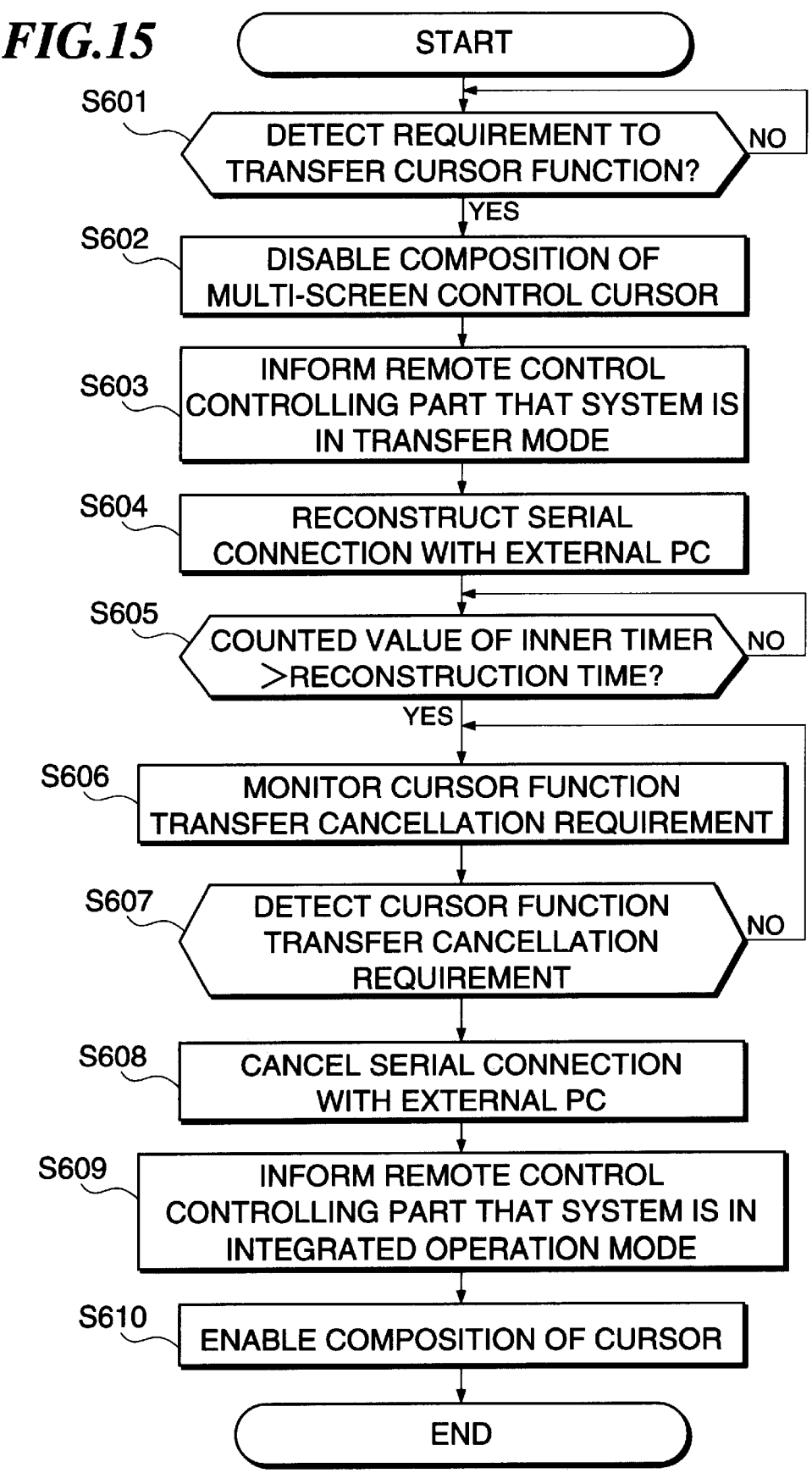

MULTI-SCREEN DISPLAY SYSTEM AND METHOD

BACKGROUND OF THE INVENTION

1. Field of the Invention

The present invention relates in general to a multi-screen display system and method, which enables the simultaneous display of image data inputted from a plurality of image sources on a display unit.

2. Description of Related Art

In recent years, image data supplied from a DTV (digital television) and a DVD (digital video disk), a PC personal computer and the like are increasingly displayed on a multi-screen of a large display unit such as a liquid crystal projector and a plasma display. Accordingly, there is the necessity of displaying a combination of image data supplied from different image media on this large display unit, which is regarded as a central device for multimedia, in homes. Therefore, the image display system needs to have a function of displaying a plurality of images at the same time. A currently proposed large display unit has a function of arbitrarily arranging and displaying, on a screen, the image data supplied from a plurality of different media connected thereto to thereby display a plurality of image data at the same time. More specifically, a multi-screen display system is constructed by using the large display unit as a multi-screen viewer.

If, however, PC image data are displayed on the screen of the above-mentioned conventional multi-screen display system, the image data should be edited and changed by operating a cursor or mouse of a PC. This is because a cursor generating means and an application control are provided inside the PC. If a broadcast image of an interactive integrated digital broadcasting system, etc. is laid out as a part of a display on a multi-screen, the resolution of the image is converted to a resolution intended by a broadcasting station and then an action must be taken to change the display on the broadcasting screen. This is because currently-expected broadcast images construct a menu screen with the resolution intended by the broadcasting station. If the user converts the resolution to display the multi-screen, an interactive selection and the like may become impossible. For this reason, the conventional multi-screen display system is not capable of performing the unified control of different media by using the large display unit as a central control means. In other words, a user interface cannot be operated easily.

SUMMARY OF THE INVENTION

It is therefore an object of the present invention to provide a multi-screen display system and method that realizes the unified control relating to each image on the multi-screen.

The above object can be accomplished by providing a multi-screen display system comprising input means for inputting images from a plurality of image sources, display means having a multi-screen capable of displaying the inputted images, image source determining means for determining a type of each of the image sources, layout determining means for determining a layout of display regions for arranging the inputted images on the multi-screen of the display means, cursor control means for generating a multi-screen control cursor for inputting commands on the multi-screen and controlling operation thereof, and display region identifying means for identifying a display region on the multi-screen of the display means in which the multi-screen control cursor is positioned, and wherein the cursor control means determines a role of the multi-screen control cursor in the display region where the multi-screen control cursor is positioned according to a type of an image source of an image displayed in the display region, and the cursor control means controls generation of the multi-screen control cursor and the operation thereof so that the multi-screen control cursor can play the determined role.

This enables the unified control of the images on the multi-screen.

The multi-screen display system is preferably characterized in that the plurality of image sources includes at least one image source providing an interactive operational environment, and the cursor control means sets a role of the multi-screen control cursor corresponding to the interactive operational environment when an image source of an image displayed in the display region where the multi-screen control cursor is positioned provides the interactive operational environment. This enables the control to be achieved on the multi-screen suitably for the interactive operational environment.

The multi-screen display-system is preferably characterized in that the at least one image source providing the interactive operational environment has a cursor generation controlling function of generating a cursor on the at least one image source and controlling operation of the cursor, and the cursor control means has control transfer means operable if the image source of the image displayed in the display region where the multi-screen control cursor is positioned has the cursor generation controlling function, for transferring control relating to the generation and operation of the multi-screen control cursor to the cursor generation controlling function of the image source having the cursor generation controlling function so that the multi-screen control cursor is switched to the cursor generated by the image source having the cursor generation controlling function. The edition and change of the images at the image source side having the cursor generation controlling function can be performed on the multi-screen, not at the image source side.

The image source having the cursor generation controlling function is an information processing apparatus including a personal computer and a workstation.

The multi-screen display system is preferably characterized in that the image source having the cursor generation controlling function is provided with a serial bus, and the cursor control means has a serial bus connected to the serial bus of the image source, and the control transfer means reconstructs the connection of the serial bus of the cursor control means and the serial bus of the image source while the image source is operating, and then transfers the control relating to the generation and operation of the multi-screen control cursor to the cursor generation controlling function of the image source.

Therefore, the control relating to the generation and operation of the cursor can easily be transferred to the cursor generation controlling function of the image source.

The serial bus of the image source and the serial bus of the cursor control means are universal serial buses or serial buses conforming to an IEEE 1394 standard.

The multi-screen display system is preferably characterized in that the plurality of image sources includes at least one image source having a cursor generation controlling function of controlling the cursor control means to generate an interactive cursor for moving and changing exclusively interactive select buttons, and if the image source of the image displayed in the display region where the multi-screen control cursor is positioned has the cursor generation controlling function, the cursor control means turns off a display of the multi-screen control cursor to generate the interactive cursor according to the cursor generation controlling function of the image source and controls operation of the interactive cursor. Therefore, image sources can be changed on the multi-screen.

The multi-screen display system is preferably characterized in that the plurality of image sources includes at least one image source having a cursor generation controlling function of controlling the cursor control means to generate the multi-screen control cursor, and if the image source of the image displayed in the display region where the multi-screen control cursor is positioned has the cursor generation controlling function, the cursor control means generates the multi-screen control cursor according to the cursor generation controlling function of the image source and changes size, color and movement amount of the multi-screen control cursor according to a resolution of the display region where the image of the image source having the cursor generation controlling function is displayed. The cursor can be operated in a comfortable manner suitable for the screen.

The image source having the cursor generation controlling function provides a digital broadcasting according to an integrated digital broadcasting system.

The multi-screen display system is preferably characterized in that if the multi-screen control cursor on the multi-screen is located in a display region of the digital broadcasting according to the integrated digital broadcasting system, the cursor control means converts a position of the multi-screen control cursor to a position desired by a provider of the integrated digital broadcasting system, and wherein if the converted position of the multi-screen control cursor is within a region of a button property of changing interactive scenes, the cursor control means takes an action to change scenes according to a scenario of the digital broadcasting when received. Therefore, the scenes can be changed without fail.

The above object can be accomplished by a multi-screen display method which comprises a receiving step of receiving images from a plurality of image sources, displaying the received images on a multi-screen of one display unit, an image source type determining step of determining a type of each of the image sources, a layout determining step of determining a layout of display regions, for arranging the received images on the multi-screen of the display unit, a cursor generating step of generating a multi-screen control cursor for inputting commands on the multi-screen and operating the multi-screen control cursor, a display region identifying step of identifying a display region on the multi-screen of the display means in which the multi-screen control cursor is positioned, and a cursor control step of determining a role of the multi-screen control cursor in the display region where the multi-screen control cursor is positioned according to a type of an image source of an image displayed in the display region, and controlling generation of the multi-screen control cursor and operation thereof so that the multi-screen control cursor can play the determined role.

This enables the unified control of the images on the multi-screen.

The multi-screen display system is preferably characterized in that the plurality of image sources includes at least one image source providing an interactive operational environment, and the cursor control step sets a role of the multi-screen control cursor corresponding to the interactive operational environment when an image source of an image displayed in the display region where the multi-screen control cursor is positioned provides the interactive operational environment. This enables the control on the multi-screen suitably for the interactive operational environment.

The multi-screen display method is preferably characterized in that the at least one image source providing the interactive operational environment has a cursor generation controlling function of generating a cursor on the at least one image source and controlling operation of the cursor, and if the image source of the image displayed in the display region where the multi-screen control cursor is positioned has the cursor generation controlling function, the cursor control step transfers control relating to the generation and operation of the multi-screen control cursor to the cursor generation controlling function of the image source having the cursor generation controlling function so that the multi-screen control cursor is switched to the cursor generated by the image source having the cursor generation controlling function. The edition and change of the images at the image source side having the cursor generation controlling function can be performed on the multi-screen, not at the image source side.

The image source having the cursor generation controlling function is an information processing apparatus including a personal computer and a workstation.

The multi-screen display method is characterized in that the image source having the cursor generation controlling function is provided with a serial bus, and the cursor control means has a serial bus connected to the serial bus of the image source, and wherein the cursor control step comprises reconstructing the connection of the serial bus of the cursor control means and the serial bus of the image source while the image source is operating, and then transferring the control relating to the generation and operation of the multi-screen control cursor to the cursor generation controlling function of the image source. Therefore, the control relating to the generation and operation of the cursor can easily be transferred to the cursor generation controlling function of the image source.

The serial bus of the image source and the serial bus of the cursor control means are universal serial buses or serial buses conforming to an IEEE 1394 standard.

The multi-screen display method is characterized in that the plurality of image sources includes at least one image source having a cursor generation controlling function of controlling the cursor control means to generate an interactive cursor for moving and changing exclusively interactive select buttons, and wherein if the image source of the image displayed in the display region where the multi-screen control cursor is positioned has the cursor generation controlling function, the cursor control step turns off a display of the multi-screen control cursor to generate the interactive cursor according to the cursor generation controlling function of the image source and controls operation of the interactive cursor. Therefore, change of the image sources and the like can be performed on the multi-screen.

The multi-screen display method is characterized in that the plurality of image sources includes at least one image source having a cursor generation controlling function of controlling the cursor control means to generate the multi-screen control cursor, and wherein if the image source of the image displayed in the display region where the multi-screen control cursor is positioned has the cursor generation controlling function, the cursor control step generates the multi-screen control cursor according to the cursor generation controlling function of the image source and changes size, color and movement amount of the multi-screen control cursor according to a resolution of the display region where the image of the image source having the cursor generation controlling function is displayed. Therefore, the cursor can be operated in a comfortable manner suitable for the screen.

The image source having the cursor generation controlling function provides a digital broadcasting according to an integrated digital broadcasting system.

The multi-screen display method is preferably characterized in that if the multi-screen control cursor on the multi-screen-is located in a display region of the digital broadcasting according to the integrated digital broadcasting system, the cursor control step converts a position of the multi-screen control cursor to a position desired by a provider of the integrated digital broadcasting system, and if the converted position of the multi-screen control cursor is within a region of a button property of changing interactive scenes, the cursor control step takes an action to change scenes according to a scenario of the digital broadcasting when received. Therefore, the scenes can be changed without fail.

The above and other objects of the invention will become more apparent from the following drawings taken in conjunction with the accompanying drawings.

BRIEF DESCRIPTION OF THE DRAWINGS

FIG. 8 is a view showing a layout management table for use in a control cursor role changing function in the multi-screen display system in FIG. 1.

FIG. 15 is a flow chart showing a process of transferring a cursor function in a step S306 in FIG. 9.

DETAILED DESCRIPTION OF THE PREFERRED EMBODIMENT

This invention will be described in further detail by way of example with reference to the accompanying drawings.

Figure 1:
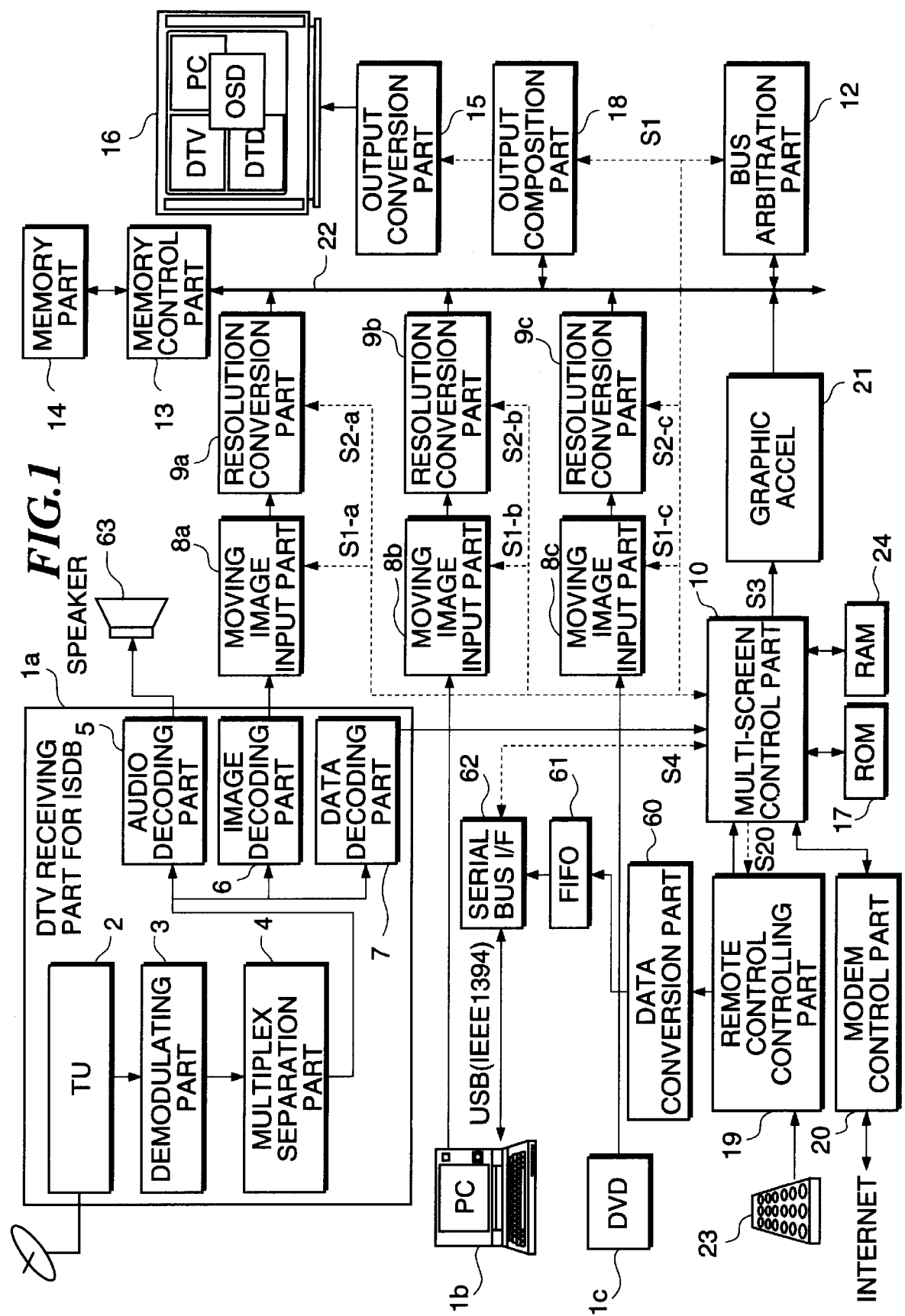
FIG. 1 is a block diagram showing the structure of a multi-screen display system according to an embodiment of the present invention.

FIG. 1 is a block diagram showing the structure of a multi-screen display system according to a preferred embodiment of the present invention.

As shown in FIG. 1, the multi-screen display system simultaneously displays images supplied from three independent image sources (a DTV receiving part 1a for ISDB, a PC 1b and a DVD 1c) on a multi-screen of a display device 16.

A description will now be given of the ISDB prior to a description of the DTV receiving part (hereinafter referred to as a receiving part) 1a for the ISDB. With the development in digital techniques, an integrated services digital broadcasting (ISDB) system for digitizing information including broadcasting signals have been researched and developed in the field of broadcasting. The ISDB system digitizes existing broadcasting signals (standard television signals and high vision signals), software and facsimile data and multimedia information such as sounds, graphics and images, and integrates and multiplexes them. Then, the ISDB system modulates them in conformity with a transmission mode and then transmits them. When various information including broadcasting signals are multiplexed, it is possible to integrate and multiplex additional information to be used as control information at a receiving side, and transmit the additional information at the same time. The integrated ISDB broadcasting signals (digital signals) are transmitted through terrestrial waves, satellite waves, optical cables and the like. A receiving terminal receives the integrated ISDB broadcasting signals and distinguishes desired signals from others. The desired signals can be displayed on a monitor so that a user can enjoy a normal TV broadcasting, and can be recorded and stored by a recording means and transferred to another terminal. Further, the received additional information can be used to control the monitor, control a recording and process images displayed on the monitor according to the user's intentions. In short, an interactive broadcasting system can be constructed.

The receiving part 1a has a tuner part 2, which receives integrated ISDB broadcasting signals (digital signals) through terrestrial waves, satellite waves, optical cables and the like. The receiving part 1a outputs the received signals to a demodulating part 3 via a band-pass filter, a down converter and the like. The demodulating part 3 demodulates the signals according to the transmission mode, and corrects errors or the like to supply a desired MPEG2 transport stream to a multiplex separation part 4. The multiplex separation part divides the transport stream into MPEG2 video data, audio data and additional information of a desired program. An audio decoding part 5 decodes the MPEG2 audio data and outputs an audio signal to a speaker 63. An image decoding part 6 decodes the MPEG2 video data, and converts the video data into a raster scan display format. Then, the video data as a broadcast image is inputted to the following moving image input part 8a. A data decoding part 7 decodes the MPEG2 additional information, and outputs the additional information to a multi-screen control part 10. This means acquiring a scenario of a multimedia information service provider from an object written in a scenario description language such as MHEG-5 and HTML. The scenario is composed of properties (e.g., size, position and coding format) of constructed contents. The multi-screen control part 10 interprets the scenario, and constructs an ISDB data broadcast image in association with a graphic accelerator 21 and the image decoding part 6.

The PC 1b is a personal computer, a workstation or the like, and outputs image data, which is inputted to the moving image input part 8b as analog signals or digital signals in a RGB raster format. The PC1b has a serial bus interface such as USB (Universal Serial Bus) and IEEE 1394. The serial bus executes a hot plug function.

The DVD 1c is a DVD unit for regenerating a DVD ROM and the like and outputs image data, which is inputted to the moving image input part 8c as analog signals or digital signals in a YUV raster format.

The moving image input part 8a receives the image data outputted from the image decoding part 6. The moving image input part 8b receives the image data outputted from the PC 1b. The moving image input part 8b has an A/D converter and a PPL (Phase Locked Loop) circuit for sampling the image data if the inputted image data is analog signals. The moving image input part 8b has a decoding device and a differential buffer if the inputted image data is digital signals such as LDVS (Low Voltage Differential Signals). The moving image input part 8c receives the image data outputted from the DVD 1c. The moving image input part 8c has a color conversion circuit for converting the signals from YUV signals into RGB signals, an IP conversion circuit for converting a scanning mode from an interlace mode into a progressive mode, and the like if the inputted image data are composite signals of the television and the DVD. The moving image input parts 8a, 8b, 8c capture the image data from three image sources 1a, 1b, 1c in different timings. At the same time as the capture of the image data, the moving image input parts 8a, 8b, 8c capture control signals for capturing the image data; e.g., a horizontal synchronous signal for synchronizing one line, a vertical synchronous signal for synchronizing one frame or one field, a clock signal for sampling a pixel, and a display enable signal indicating a transfer period of effective pixel data.

The image data captured into the moving image input parts 8a, 8b, 8c are processed in a predetermined manner, and are then inputted to corresponding resolution converting parts 9a, 9b, 9c. The resolution converting parts 9a, 9b, 9c have a function of converting a display format (i.e., the number of display lines, the number of dots and the number of colors) of the inputted image data under the control of the multi-screen control part 10, and have a bus interface function of outputting the image data to a common graphic bus 22.

The image data outputted from the resolution converting parts 9a, 9b, 9c is stored in a memory part 14, which has a capacity of at least four-screen display images, under the control of a memory control part 13, via a graphic bus 22. At the same time as the storage of the image data in the memory part 14, the already-stored image data is read from the memory part 14. When the already-stored image data is read, an output composition part 18 issues an address of the image data to be displayed to the memory control part 13 in accordance with a multi-window management command from the multi-screen control part 10, and the memory control part 13 reads the image data to be displayed from the memory part 14. A bus arbitration part 12 scalably manages this asynchronous access to the memory part 14 according to the order of priority.

The output composition part 18 receives the read image data, and composes the read image data to thereby generate final composite image data. The composite image data is inputted to an output conversion part 15, which controls the driving of the display and converts the display format in synchronism with a frame rate of a display device 16, according to characteristics of the display device 16, according to characteristics of the display device 16.

The display device 16 is comprised mainly of a flat panel (a display panel such as a liquid crystal display panel and a plasma display panel) having a matrix electrode structure or a CRT (a cathode-ray tube). More specifically, if the image source supplies a high-vision TV broadcasting, a large display unit capable of displaying a high-vision image is used as the display device 16, and if the image source is the PC, a large display unit capable of displaying a high-precision image of SXGA or more is used as the display device 16.

The multi-screen control part 10 controls the entire multi-screen display system, and includes a CPU (not illustrated) that executes the control according to a control program stored in a ROM 17, a counter (not illustrated) that counts the elapsed time, a peripheral input/output interface (not illustrated) and the like. The results of the operation and processing performed by the CPU are temporarily stored in a RAM 24. The ROM 17 contains a character font and the like in addition to the control program. The character font is used for displaying character information of WWW and data broadcasting.

The multi-screen control part 10 connects to a modem control part 20 for connecting the system with an Internet, a remote control controlling part 19 and a graphic accelerator 21. The remote control controlling part 19 receives data such as commands transmitted from a remote control 23 through infrared rays. The remote control 23 is able to transmit data such as commands through the infrared rays. The remote control controlling part 19 receives data such as commands from the remote control 23, and transmits the data to a data conversion part 60. The data conversion part 60 converts the data from the remote control part 19 into serial packet data. In order to adjust a transfer timing of the packet data, the packet data is temporarily stored in a FIFO (First In First Out) memory 61. The packet data stored in the FIFO memory 61 is inputted to a serial bus interface (hereinafter referred to as a serial bus I/F) 62. The serial bus I/F 62 divides and converts the inputted packet data into a format conforming to a predetermined serial bus standard such as USB (Universal Serial Bus) and IEEE 1394. The acquired data is transmitted to the PC 1b.

The graphic accelerator 21 has a function of issuing commands to draw a picture and accelerating BitBlt, DMA and the like. This function is used when the multi-screen control part 10 generates an OSD (On Screen Display), an EPG (Electronic Program Guide), an ISDB screen and the like on the display device 16.

Figure 2:
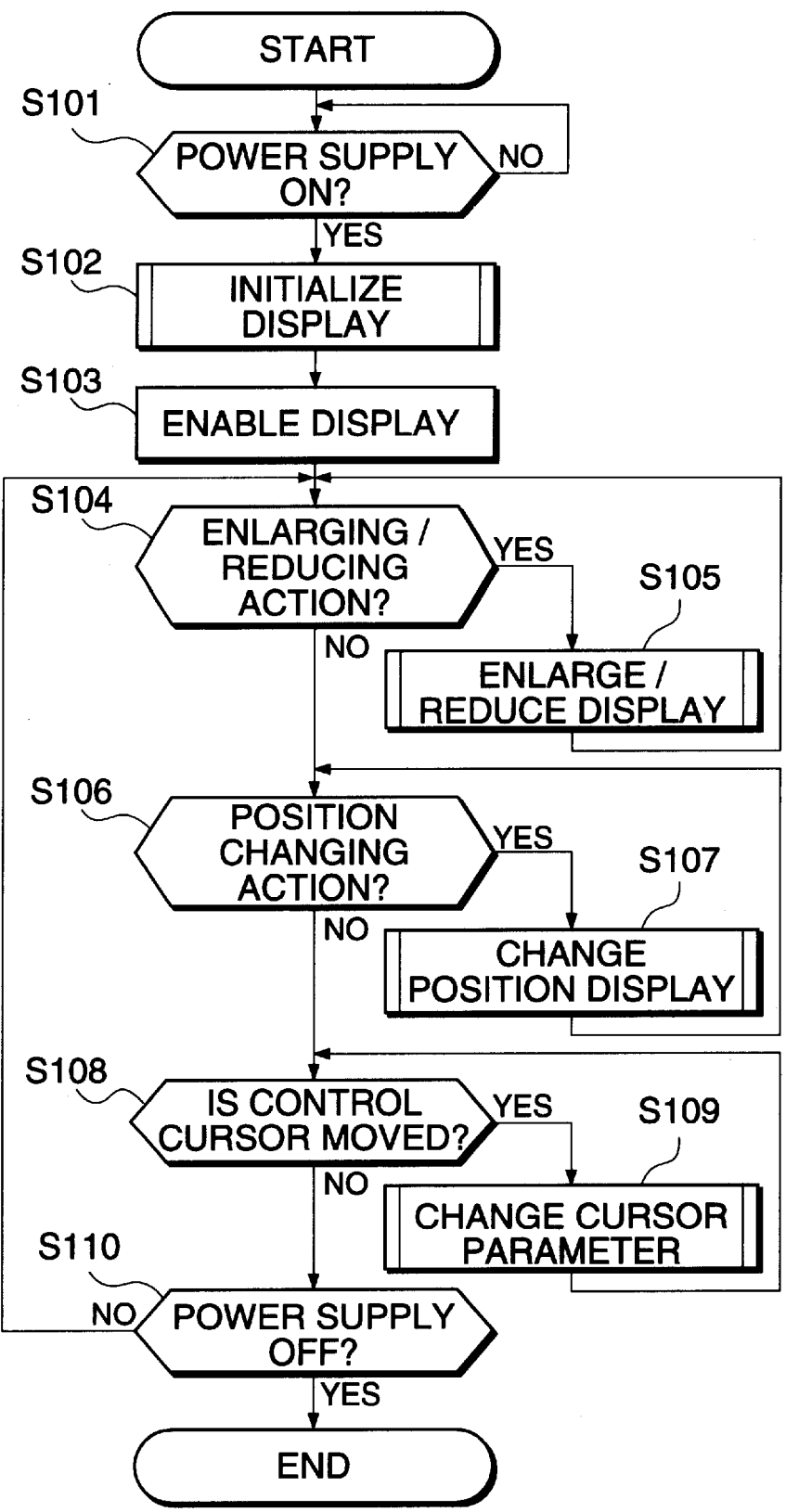
FIG. 2 is a flow chart showing a process of displaying multi-images in the multi-screen display system in FIG. 1.
Figure 3:
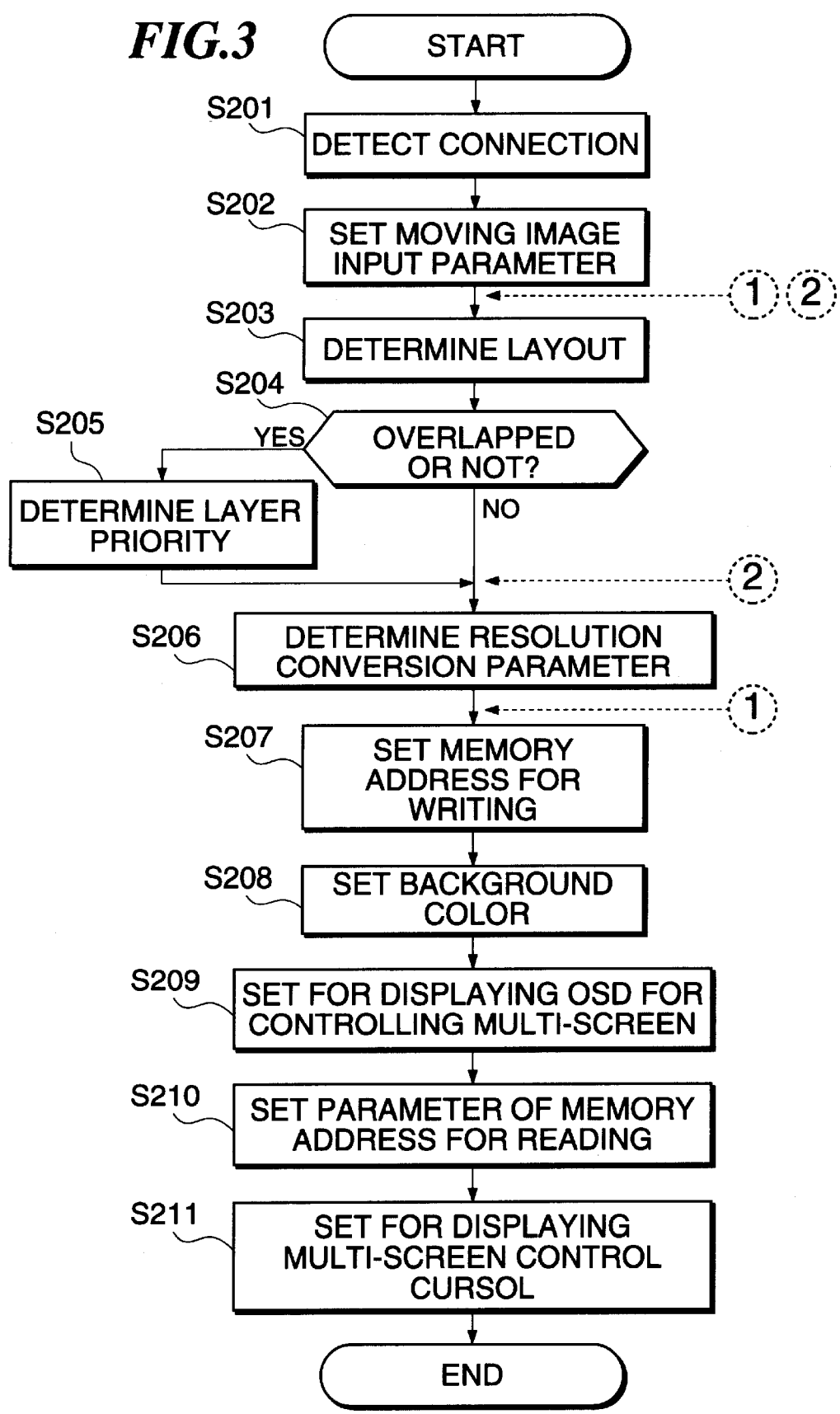
FIG. 3 is a flow chart showing a process of initializing a display in a step S102 in FIG. 2.
Figure 4:
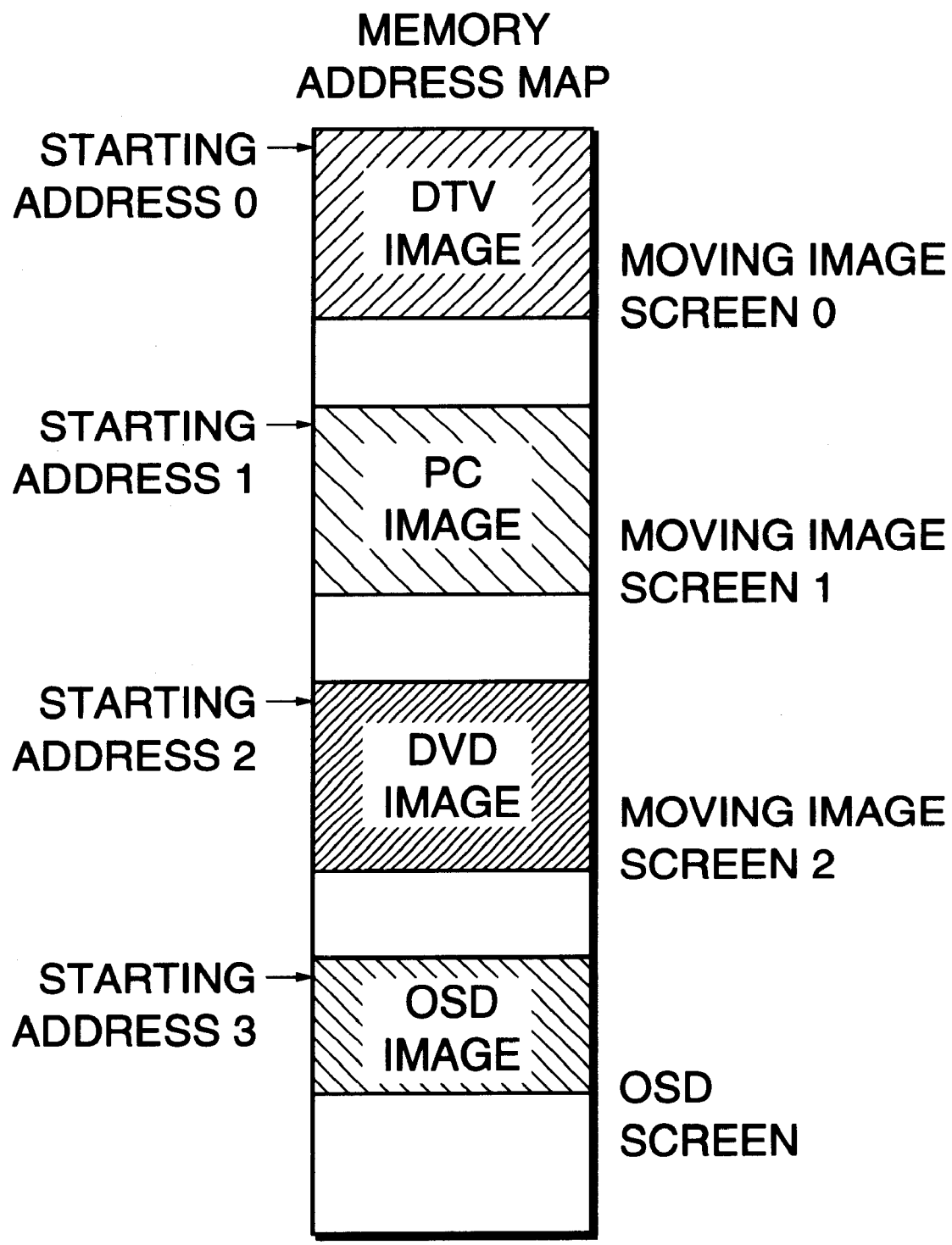
FIG. 4 is a view showing a memory address map of image data in a memory part 14 of the multi-screen display system in FIG. 1.
Figure 5:
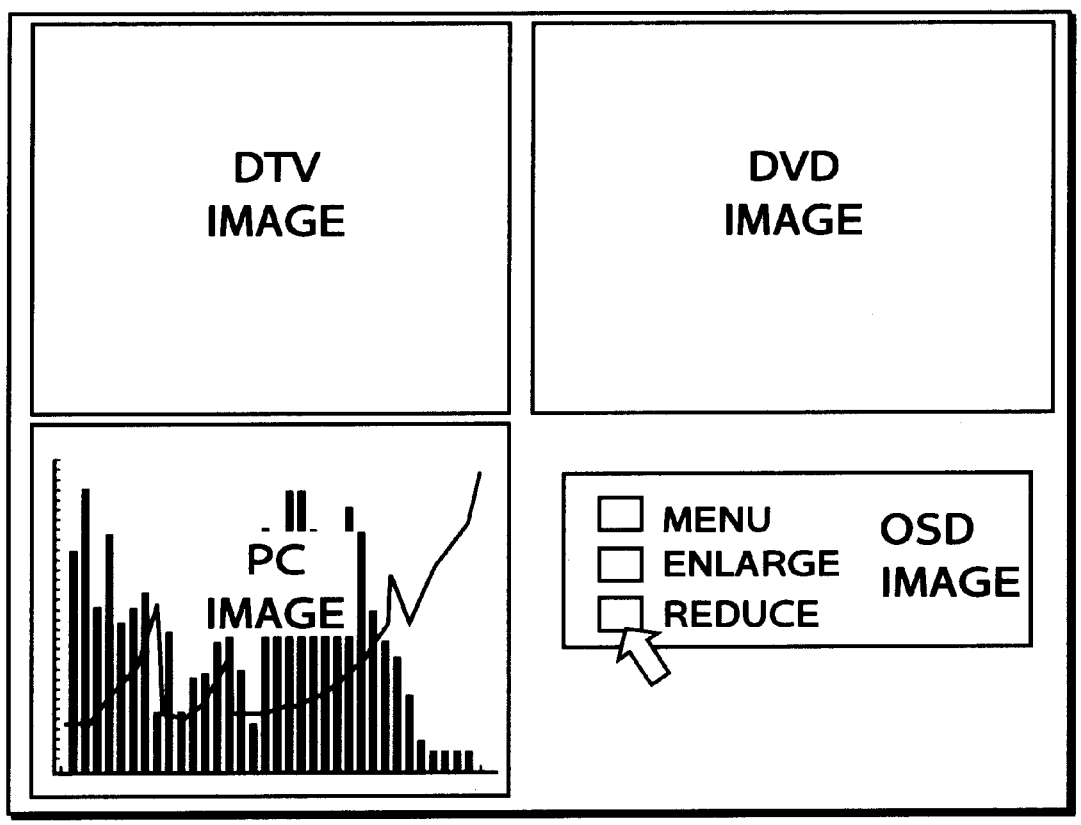
FIG. 5 is a view showing an example of a screen when the multi-screen display system in FIG. 1 is initialized.

Referring next to FIGS. 2–6, a description will be given of a multi-screen display process in the multi-screen display system according to the present invention. FIG. 2 is a flow chart showing the procedure for displaying the multi-image in the multi-screen display system in FIG. 1; FIG. 3, a flow chart showing the procedure for initializing the display in a step S102 in FIG. 2; FIG. 4, a view showing a memory address map of the image data in the memory part 14 of the multi-screen display system in FIG. 1; FIG. 5, a view showing an example of a display on a screen when the multi-screen display system in FIG. 1 is initialized; and FIG. 6, a block diagram showing the structure of the output composition part 18 of the multi-screen display system in FIG. 1.

As shown in FIG. 2, the multi-screen display system checks whether a power supply is turned on or not in a step S101. When the power supply is turned on, the display is initialized in a step S202.

In the initialization of the display, the multi-screen display system detects the connection first so as to identify image sources connected thereto in a step S201 as shown in FIG. 3. The image sources are identified by checking connection identification signals inputted from the image sources 1a, 1b, 1c to the corresponding moving image parts 8a, 8b, 8c. The connection identification signals are captured into the multi-screen control part 10 through signal conductors S1-a–c at regular time intervals. The connection identification signal is composed of a binary signal "1" or "0". If a cable for connecting the image source with the moving image input parts is pulled out, or if a power supply of the image source is turned off, the connection identification signal is "0" since the image input parts serve as a terminal resistance, thereby detecting that there is no input from the image source. In the following description, it is assumed that the connection identification signals are "1", and the image sources 1a, 1b, 1c are connected to the multi-screen display system. If the connection identification signals are "0", the connection identification signals are checked in the step S201 until they become "1".

When the connection of the image sources is detected according to the connection identification signals, in a step S202, parameters (e.g., information relating to the number of display dots, the number of display lines and horizontal and vertical timings) are set for inputting moving images from the image sources, which are detected as being connected to the multi-screen display system. In this case, the parameters for inputting the moving images from the image sources detected as being connected are set by transmitting the detected parameters to the corresponding moving image input parts 8a, 8b, 8c through the signal conductors S1-a–c. The parameters can also be found in such a manner that the moving image input parts directly count the number of clocks and the number of horizontal synchronous signals by using horizontal synchronous signals for synchronizing one line, vertical synchronous signals for synchronizing one frame or one field, clock signals for sampling one pixel, and the like. The information relating to the timing of inputting images from the connected image sources is captured into the multi-screen control part 10.

Then, the process goes to a step S203 to determine a display layout on a screen, to which the images are inputted from at least one image source that is detected as being connected to the multi-screen display system. In the initialization of the display, the images are displayed in a layout of a predetermined default. In the following step S204, it is determined whether images are overlapped on the determined display layout. If images are overlapped, a display starting position and a display ending position, horizontal and vertical enlargement/reduction magnifications on the display device 16 of each image source are written in the RAM 24, and then the process goes to a step S205. If no images are overlapped, a display starting position and a display ending position, horizontal and vertical enlargement/reduction magnifications on the display device 16 of each image source are written in the RAM 24, and then the process goes to a step S206 skipping through the step S205.

In the step S205, the priority of each layer in the overlap (a layer indicated at the top has the highest priority) is determined and is written in the RAM 24.

In the step S206, resolution conversion parameters are determined, and the determined parameters are transmitted to the corresponding resolution conversion parts 9a, 9b, 9c through signals conductors S2-a–c. Memory addresses required for writing outputs of the resolution conversion parts 9a, 9b, 9c into the memory part 14 are determined in a next step S207. In the present embodiment, the memory part 14 is composed of three screens for moving images and one screen for the OSD. When the outputs are stored in the memory part 14, the image is not yet on-screen. The multi-screen control part 10 transmits the starting addresses 0–3 in FIG. 4 to the resolution conversion parts 9a, 9b, 9c and the graphic accelerator 21 through the signal conductors S2-a–c, and the starting addresses 0–3 are used as offset values for the memory addresses of each writing address generating part.

Then, the process goes to a step S208 to set a background color (pattern) when a multi-window is displayed. More specifically, the background color is set in a background register 37 (see FIG. 6) of the output composition part 18. In a next step S209, the setting is performed to display the OSD for controlling the multi-screen. More specifically, the multi-screen control part 10 issues commands for drawing the OSD to the graphic accelerator 21, and writes characters and other data developed in a bit map format by the DMA function of the graphic accelerator 21 in the memory part 14. The layout of the OSD on the multi-screen is also determined. In this case, the OSD has the highest priority.

In a next step S210, reading addresses for reading the outputs of in the memory part 14 are set in a next step S210. A variety of matters are thus set for operating the output composition part 18.

Figure 6:
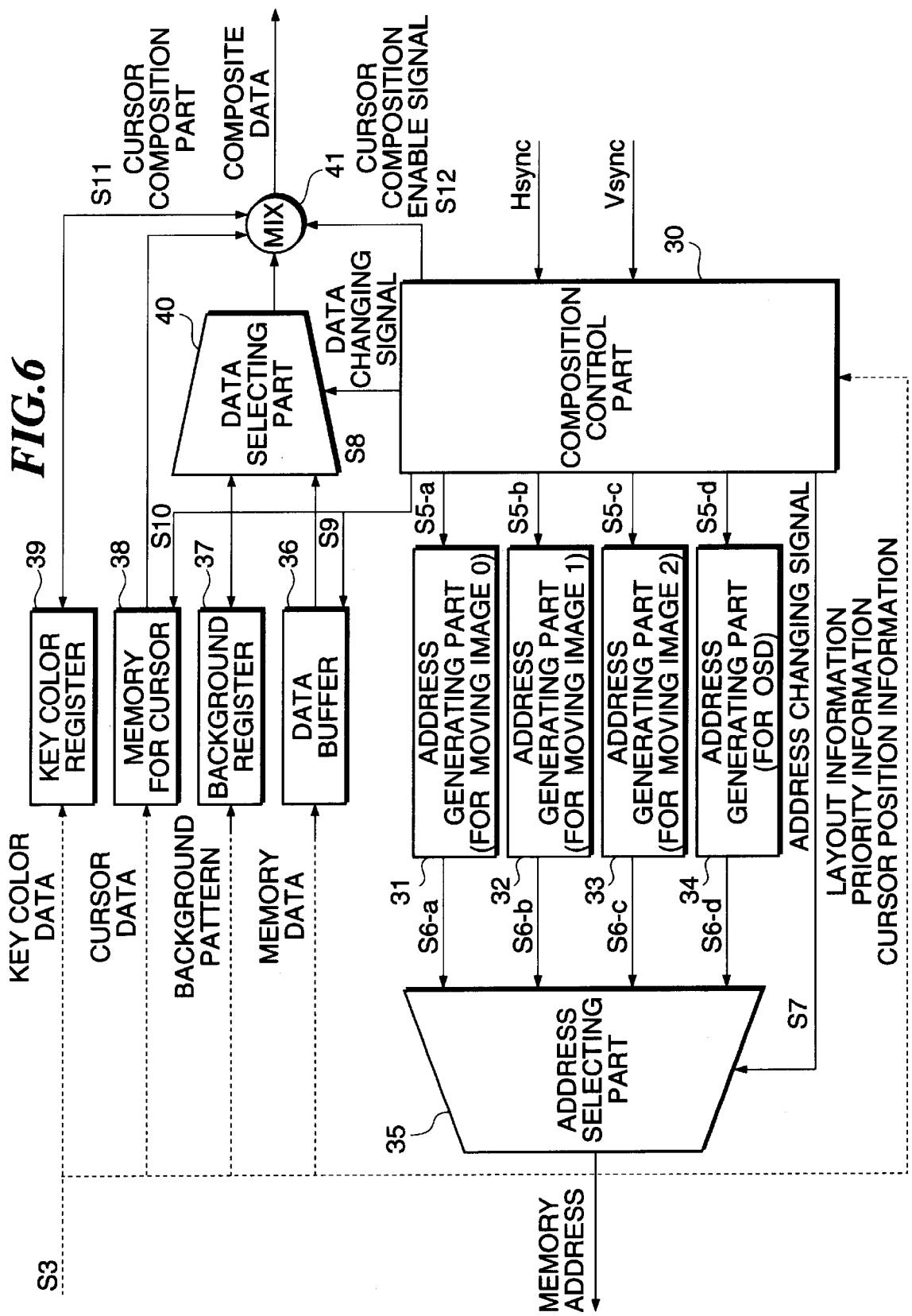
FIG. 6 is a block diagram showing the structure of an output composing part 18 of the multi-screen display system in FIG. 1.

A brief description will now be given of the operation of the output composition part 18 with reference to FIG. 6. The output composition part 18 has a composition control part 30. The composition control part 30 generates a variety of control signals acquired by the comparison between a horizontal pixel counter and a vertical line counter operating according to synchronous signals (Hsync, Vsync). The composition control part 30 counts raster scans in a display period by capturing a horizontal counter starting value (a time from the Hsync to the start of an effective pixel) and a vertical line starting value (a time from the Vsync to the start of an effective line), and the number of horizontal pixels and the number of vertical lines, in response to a signal S3 from the multi-screen control part 10. With respect to addresses for reading the inputs to be composed (the inputs of the image source written in the memory part 14), the composition control part 30 captures a composition starting address (an offset value from the start of effective counting of the composition control part 30) reflecting information on the layout of the image sources, the number of horizontal pixels and the number of vertical lines (these numbers are set in address generating parts 31–34) for respective screens, in response to the signal S3 from the multi-screen control part 10. If the resulting values correspond to the counted values of the composition control part 30, the counting operation of the address generating parts 31–34 is kicked through signal conductors S5-a–d. Therefore, the four address generating parts 31–34 count independently of one another. The counter is normally reset at intervals of Vsync.

The counted values of the address generating parts 31–34 are outputted as reading addresses directly to an address selecting part 35 through signal conductors S6-a–d. In the present embodiment, different image sources are managed independently of one another in the construction of the screen, and thus, the images inputted from the image sources are composed by changing the addresses. More specifically, the images are composed in such a manner that the address selecting part 35 changes the addresses. In response to the signal S3, the composition control part 30 captures the composition changing counted number according to the layout information and the priority information, and compares the captured counted values with the counted values of the counters in the composition control part 30. If they correspond to one another, the composition control part 30 issues an address changing signal S7. Consequently, the data is read from the memory part 14, and the data read under the control of a write control signal S9 from the composition control part 30 is written in a data buffer 36. The data is read from the data buffer 36 under the control of a read control signal S9 from the composition control part 30, and the read data is l inputted to a data selecting part 40. If the composition control part 30 determines that there is no data to be composed, it outputs a data changing signal S8 to the data selecting part 40, which outputs background data of the background color register 37.

Then, the process goes to a step S211 to set for displaying the multi-screen control cursor. A description will now be given of how to draw the cursor. First, the multi-screen control part 10 determines a rectangular region where the cursor is displayed, and orders the graphic accelerator 21 to cover the region with a specific color (a key color). In response to the order, the graphic accelerator 21 writes the rectangular region in a cursor memory 38 in FIG. 6. On the other hand, the multi-screen control part 10 orders the graphic accelerator 21 to overlap a cursor pattern stored in the ROM 17 and the covered rectangular region. In response to the order, the graphic accelerator 21 performs an operation to rewrite the rectangular region of the cursor memory 38 into a cursor pattern with a chroma key. A write control signal S10 controls the writing of the rectangular region in the cursor memory 38. The multi-screen control part 10 sets a key color in a key color register in FIG. 6, and at the same time, specifies a position where the cursor is displayed in association with cursor control information transmitted from the remote control 23 and transmits cursor overlapping positional information calculated on the basis of the specified display position to the composition control part 30. In order to compose the cursor, the composition control part 30 outputs a cursor composition enable signal S12 to a cursor composition part 41. In this state, the composition control part 30 captures the composition change counted number on the basis of the cursor overlapping positional information and compares it with the counted value of the counter in the composition control part 30. If they correspond to each other, the composition control part 30 outputs a read control signal S10. The cursor data is added to the multi-screen composition data transmitted from the data selecting part 40 by masking a key color part by the cursor composition part 41, thereby acquiring all the composition data. The multi-screen display system is initialized in this manner.

On completion of the initialization, the process goes to a step S103 in FIG. 2 to enable the display. At this time, the multi-screen is displayed on the display device 16 as shown in FIG. 5.

Then, the process goes to a step S104 to check whether an enlarging/reducing action is inputted or not. If no, the process goes to a step S106 to check whether a position changing action is inputted or not. If no, the process goes to a step S108 to check whether a control cursor moving action is inputted or not. If no, the process goes to a step S110 to check whether a power supply turning-off action is inputted or not. If no, the processing from the steps S104 is repeated.

If it is determined in the step S104 that the enlarging/reducing action is inputted, the process goes to a step S105 to expand/contract the display in accordance with the inputted enlarging/reducing action. A routine of this process is the same as the routine from the step S203 through S206 (the section (in FIG. 3). If it is determined in the step S106 that the position changing action is inputted, the process goes to a step S107 to change the position of the display in accordance with the inputted position changing action. The routine of this process is the same as the routine from the steps S203 through S205 (the section (in FIG. 3). If it is determined in the step S108 that the control cursor moving action is inputted, the process goes to a step S109 to change cursor parameters in accordance with the inputted control cursor moving action. The same process as in the step S211 is executed. If it is determined in the step S110 that the power supply turning-off action is inputted, the process is finished.

As stated above, the multi-screen display system according to the present invention functions as a viewer that is capable of expanding/contracting the inputted plurality of images and changing the positions of the images. Moreover, the multi-screen display image display system is provided with the control cursor role changing function for operating each input screen having the interactive function from the multi-screen.

Figure 7:
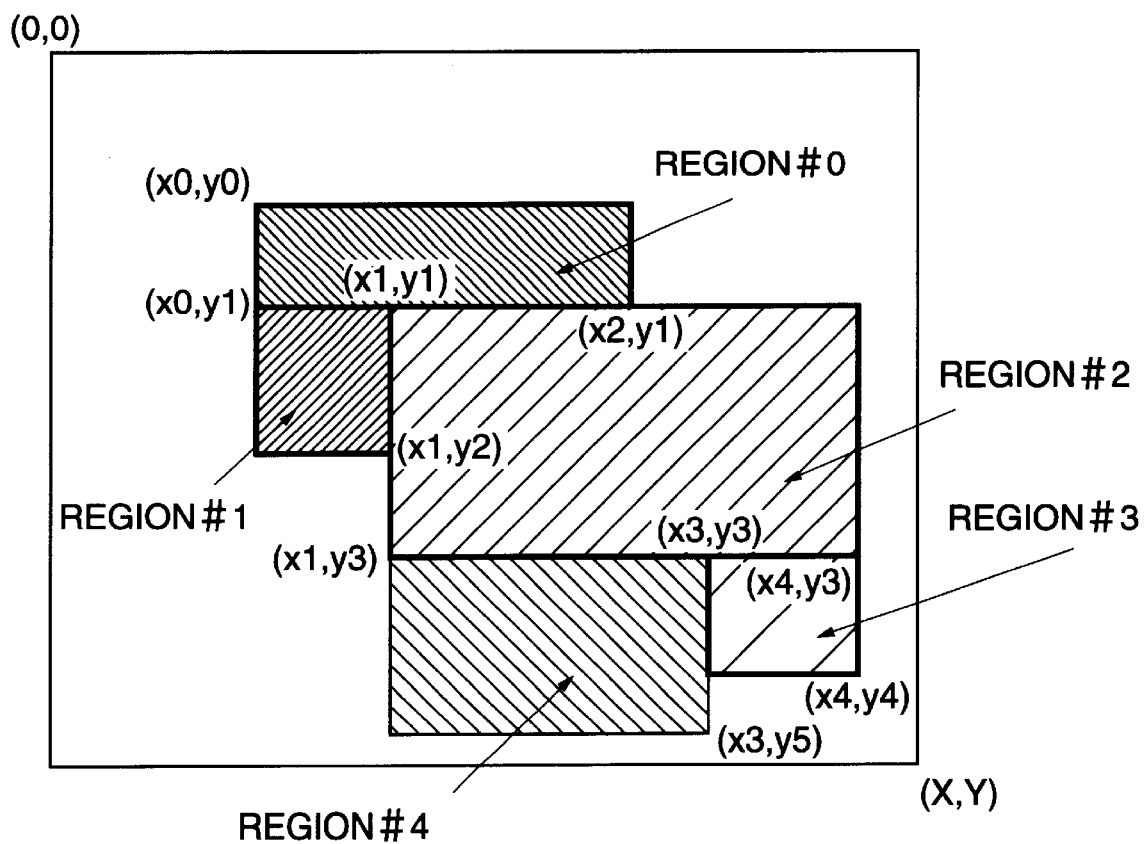
FIG. 7 is a view showing an example of a screen for explaining a control cursor role changing function in the multi-screen display system in FIG. 1.

A description will now be given of the control cursor role changing function with reference to FIGS. 7 and 8. FIG. 7 is a view showing an example of a screen for explaining the control cursor changing function in the multi-screen display system in FIG. 1, and FIG. 8 is a view showing a layout management table for the control cursor changing function in the multi-screen display system in FIG. 1.

To execute this function, the type of the image source connected to the system must be determined first with the detection of the connection in the step S201. To determine the type of the image source, a dip switch that may be designed according to the types of the image sources, and the type of the image source is determined according to a user's manual operation of the dip switch. To automatically determine the type of the image source, it can be considered that data is transmitted between the system and the PC through an IEEE 1394 port of a P&D connector proposed by VESA in the case where the PC 1b is connected as the image source. The type of the receiving part la is determined in such a manner that the broadcasting industry defines an identifier in a transport stream in the future.

Then, the multi-screen control part 10 manages the regions of the multi-screen when the layout is determined in the step S203. More specifically, in the case where the layout as shown in FIG. 7 is determined, the multi-screen control part 10 divides the display region of each inputted image into rectangular regions to create the layout management table in FIG. 8 in which starting point coordinates, ending point coordinates and detected types (the type does not have to be detected in the case of the OSD, which is created within the system of the present invention) are managed according to the regions. The layout management table is updated every time the layout is changed or the connected image source is changed.

The display position coordinates of the multi-screen control cursor generated in the step S211 are determined every time the control cursor is moved in the step S108. Thus, it is possible to determine in which region the multi-screen control cursor is located with reference to the display position coordinates and the layout management table. If the multi-screen control cursor is not located in any region, or if the multi-screen control cursor is located on a boundary between the regions, the cursor is determined as being located in a background region. Thus, the multi-screen control cursor freely moves on the screen, and is used to change the display layout by changing the position of the screen and selecting an enlarging/reducing window and select the menu of the OSD.

Figure 9:
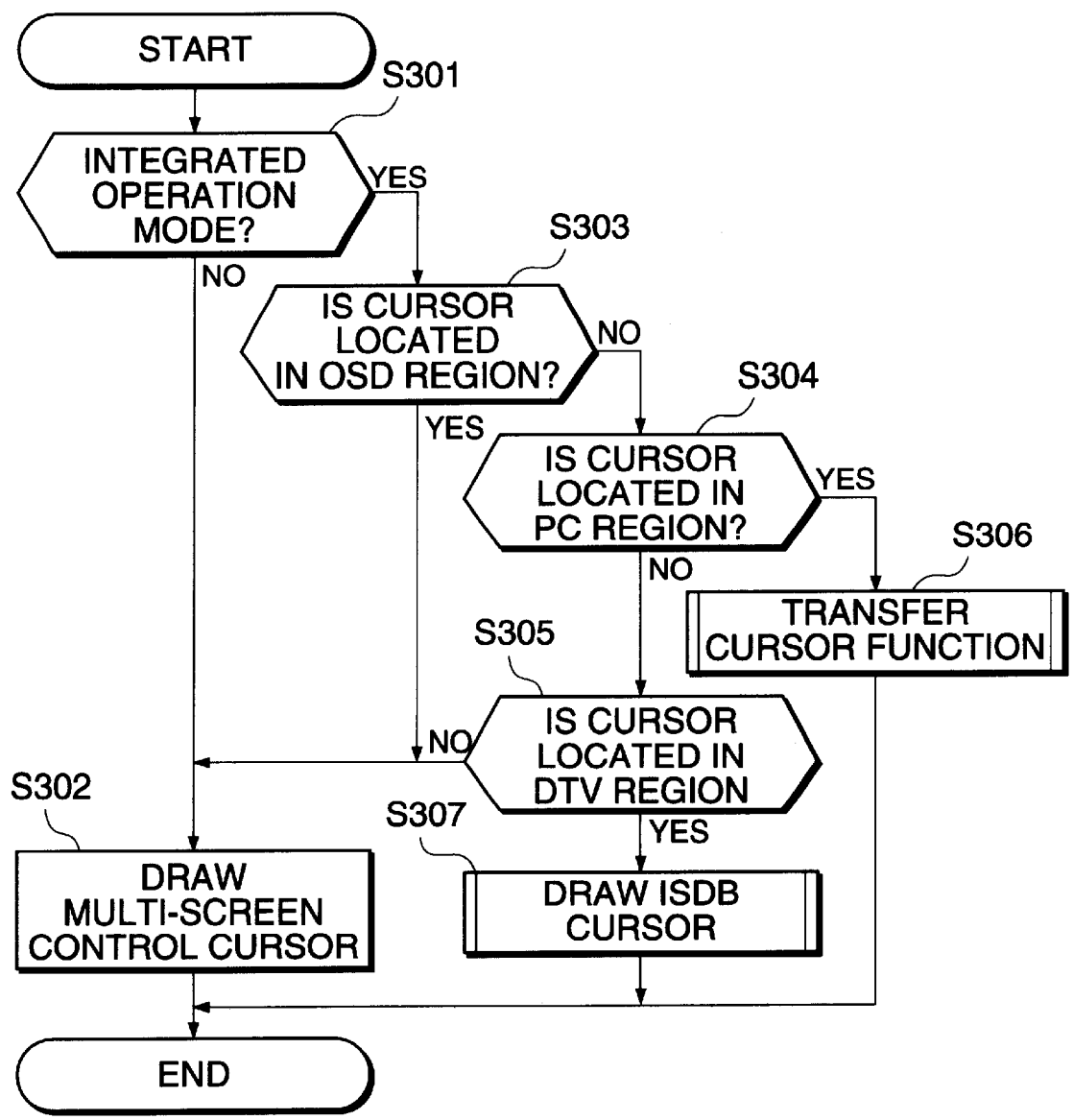
FIG. 9 is a flow chart showing a process of drawing a cursor for controlling a multiple screen in an integrated operation mode in the multi-screen display system in FIG. 1.

Referring next to FIG. 9, a description will be given of the process for drawing the multi-screen control cursor in an integrated operation mode in which the cursor parameters are changed in the step S109 shown in FIG. 2. FIG. 9 is a flow chart showing a process of drawing the cursor for controlling a multiple screen in the integrated operation mode.

First, it is determined in a step S301 whether the integrated operation mode is set or not. The integrated operation mode is executed in response to the depression of an integrated operation button provided in the remote control 23. In the integrated operation mode, the role of the multi-screen control cursor is changed according to the region where it is located (the type of the image source of the image) in order to operate each input screen having the interactive function.

If the integrated operation mode is not set, the process goes to a step S302 to draw the multi-screen control cursor normally.

If the integrated operation mode is set, the process goes to a step S303 to determine whether the multi-screen control cursor is located in an OSD region (a region #4 in FIG. 7) or not. If the multi-screen control cursor is located in the OSD region, the process goes to the step S302 to draw the multi-screen control cursor normally. If the multi-screen control cursor is not located in the OSD region, the process goes to a step S304.

It is determined in the step S304 whether the multi-screen control cursor is located in a PC region (regions #0, 1 in FIG. 7) or not. If the multi-screen control cursor is located in the PC regions (the regions #0, 1 in FIG. 7), the process goes to a step S306. Since the PC has a cursor generation controlling function for generating and operating a cursor on the screen, the cursor function is transferred to the cursor function to the cursor generation control function of the PC. Then, the process is finished. The process of transferring the cursor function will be described later.

If it is determined in the step S304 that the multi-screen control cursor is not located in the PC regions, the process goes to a step S305 to determine whether the multi-screen control cursor is located in DTV regions (regions #2, 3 in FIG. 7) or not. If the multi-screen control cursor is not located in the DTV regions, the process goes to the step S302. If the multi-screen control cursor is located in the DTV regions, the process goes to a step S307 to draw the ISDB cursor. Then, the process is finished. The process of drawing the ISDB cursor will be described later.

To exit the integrated operation mode, the integrated operation mode of the remote control 23 is pressed again to cancel the integrated operation mode, so that the system can shift to the normal multi-screen control cursor control mode in the step S302.

Referring next to FIG. 15, a description will be given of the process of transferring the cursor function in the step S306. FIG. 15 is a flow chart showing the process of transferring the cursor function in the step S306 shown in FIG. 9.

As shown in FIG. 15, whether the user requires the cursor function to be transferred to the PC or not is monitored in the PC regions in a step S601. When the user presses a transfer key of the remote control 23, the remote control controlling part 19 recognizes a command generated according to the depression of the transfer key, and instructs the multi-screen control part 10 to transfer the cursor function. Accordingly, the multi-screen control part 10 determines that the user requires the cursor function to be transferred to the PC, and goes to a step S602 to disable the composition of the multi-screen control cursor according to a cursor composition enable signal S12, thereby setting off the drawing operation of the multi-screen control cursor.

Then, the process goes to a step S603 to inform the remote control controlling part 19 that the system is in a transfer mode through a signal S20. Accordingly, the remote control controlling part 19 is ready to accept only commands in the transfer mode (e.g., a keyboard command for controlling the PC, a mouse coordinate command and a transfer cancellation command). Then, the process goes to a step S604 to reconstruct the serial connection with the PC. More specifically, a serial bus I/F 62 is controlled by the signal S4 to disconnect the serial bus once and then connect the serial bus again, and activate an inner timer for measuring a time required for the reconstruction. Therefore, the PC serves as a host on the serial bus and the system serves as a device in a serial protocol of the USB (or the IEEE 1394), and this completes the reconstruction using the hot plug function of the serial connection.

Then, the process goes to a step S605 to wait for a counted value of the inner timer to become larger than a predetermined counted value of the reconstruction time. When the counted value of the inner timer exceeds the predetermined counted value of the reconstruction time, it is determined that the transfer of the cursor function in the system is completed. In this state, the PC as the host accepts the cursor control and the input operation from the remote control 23. On the display screen of the system, the picture drawn by the cursor generation controlling function of the PC is displayed as a part of image data. More preferably, the system is provided with a wireless keyboard and a wireless mouse instead of the remote control 23, and the control directions are switched between the wireless keyboard and the wireless mouse. This provides the user with the excellent operational environment.

In a step S606, the issuance of the cursor function transfer cancellation function is only monitored, and in a step S607, it is determined whether the cursor function transfer cancellation command is detected or not. If no, the process returns to the step S606 to continue the issuance of the cursor function transfer cancellation command. When the user presses a transfer cancellation button in the remote control 23, the remote control controlling part 19 recognizes a command corresponding to the depression of the transfer cancellation button, and issues the cursor transfer cancellation command to the multi-screen control part 10. When the cursor function transfer cancellation command is detected, the process goes to a step S608 to cancel the serial connection with the PC by controlling the serial bus I/F 62 with the signal S4.

Then, the process goes to a step S609 to inform the remote control controlling part 18 that the system has returned to the integrated operation mode through the signal S20. Accordingly, the remote control controlling part 19 is ready to accept all commands in the integrated operation mode. Then, the process goes to a step S610 to enable the composite display of the multi-screen control cursor with the cursor composition enable signal S12. Thus, the drawing of the multi-screen control cursor is set on, so that the system can return from the transfer mode.

If the multi-screen control cursor is located in the display region of the PC 1b, this is automatically detected to transfer the control relating to the generation and operation of the multi-screen control cursor to the control of the PC 1*b*. This realizes the remote integrated operation on the multi-screen showing the image of the image source such as the PC having the cursor generating function.

Figure 10:
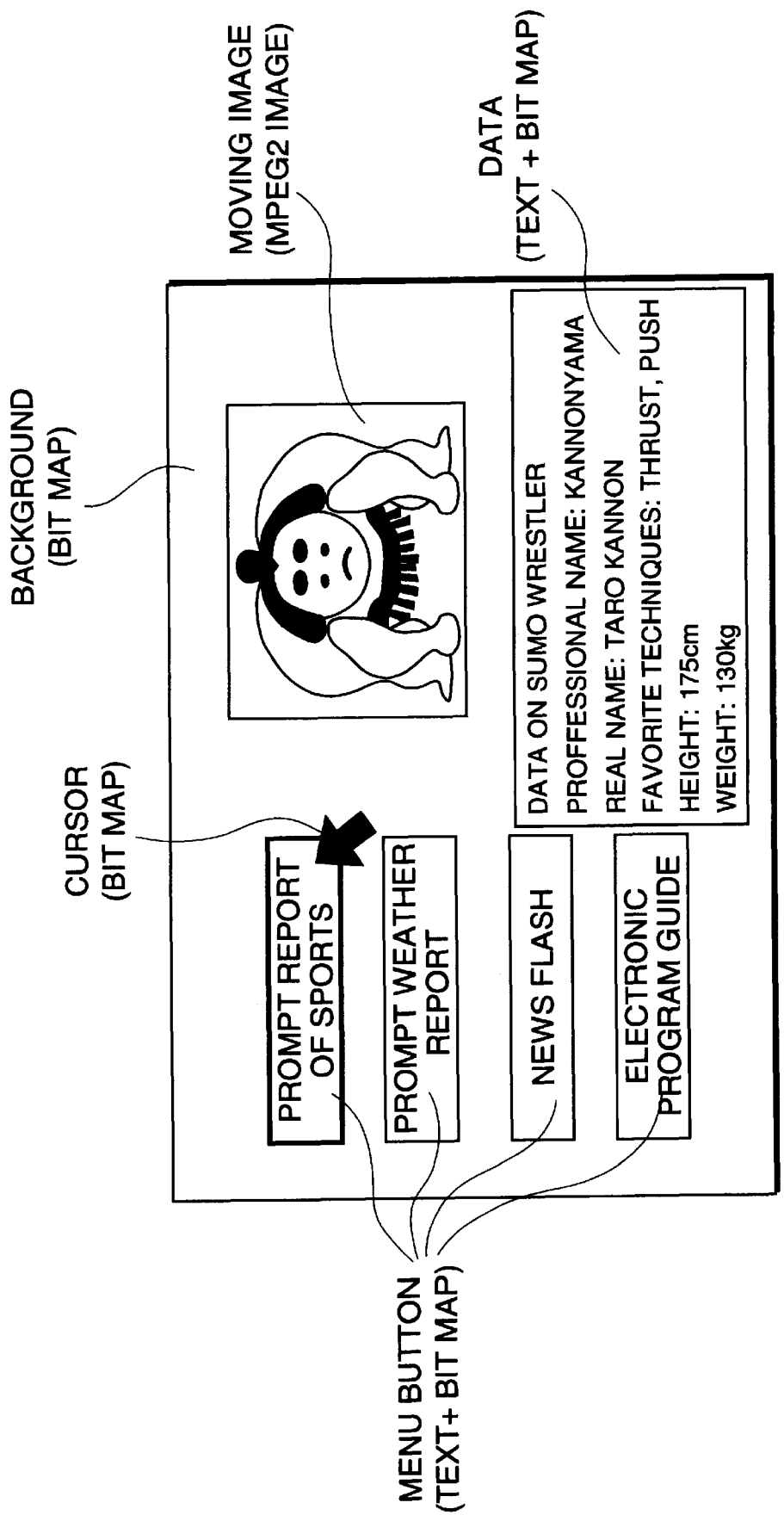
FIG. 10 is a view showing an example of a screen in a digital broadcasting for ISDB.
Figure 11:
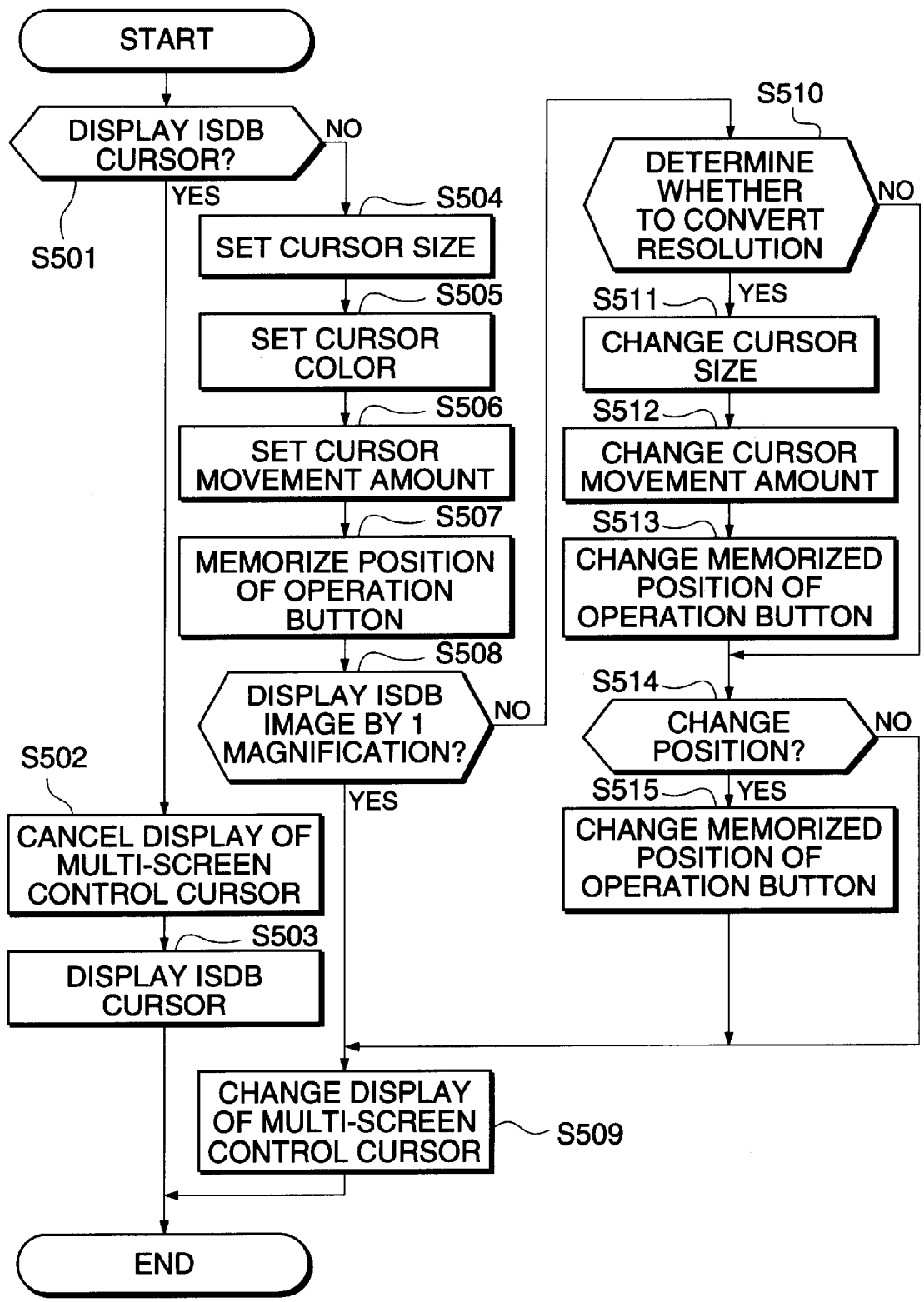
FIG. 11 is a flow chart showing a process of drawing a cursor for the exclusive use of ISDB in a step S307 in FIG. 9.
Figure 12:
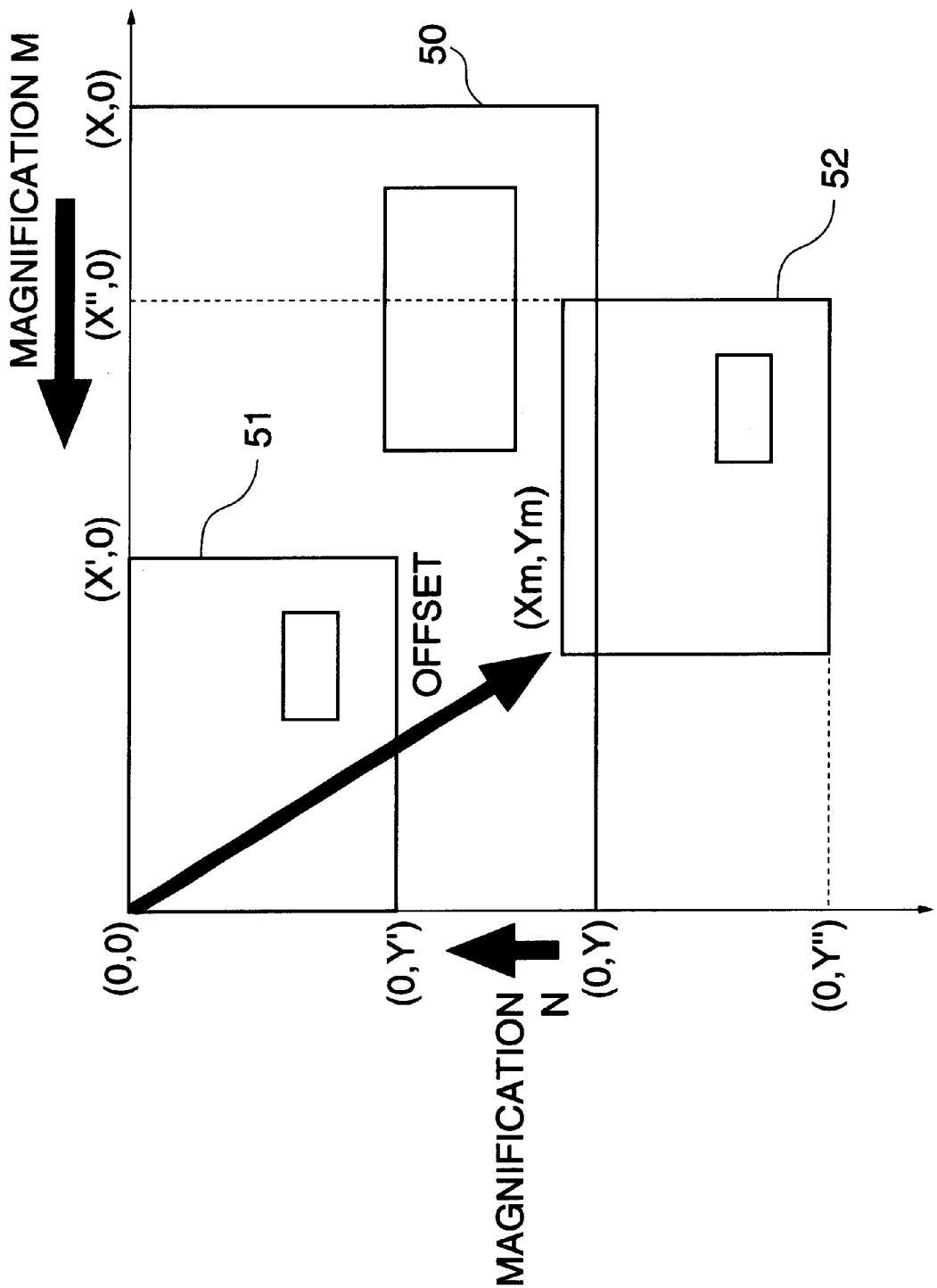
FIG. 12 is a view showing an example of a layout conversion of an ISDB image.
Figure 13:
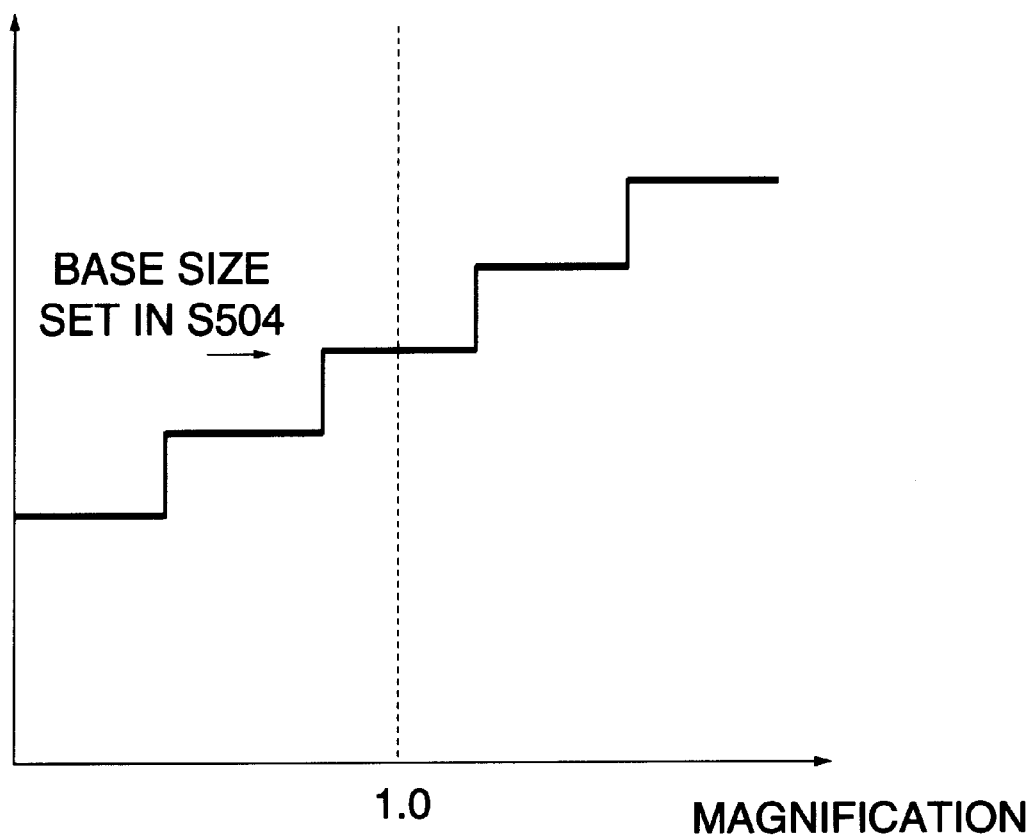
FIG. 13 is a view showing a cursor size changing table for use in drawing a cursor for the exclusive use of ISDB.
Figure 14:
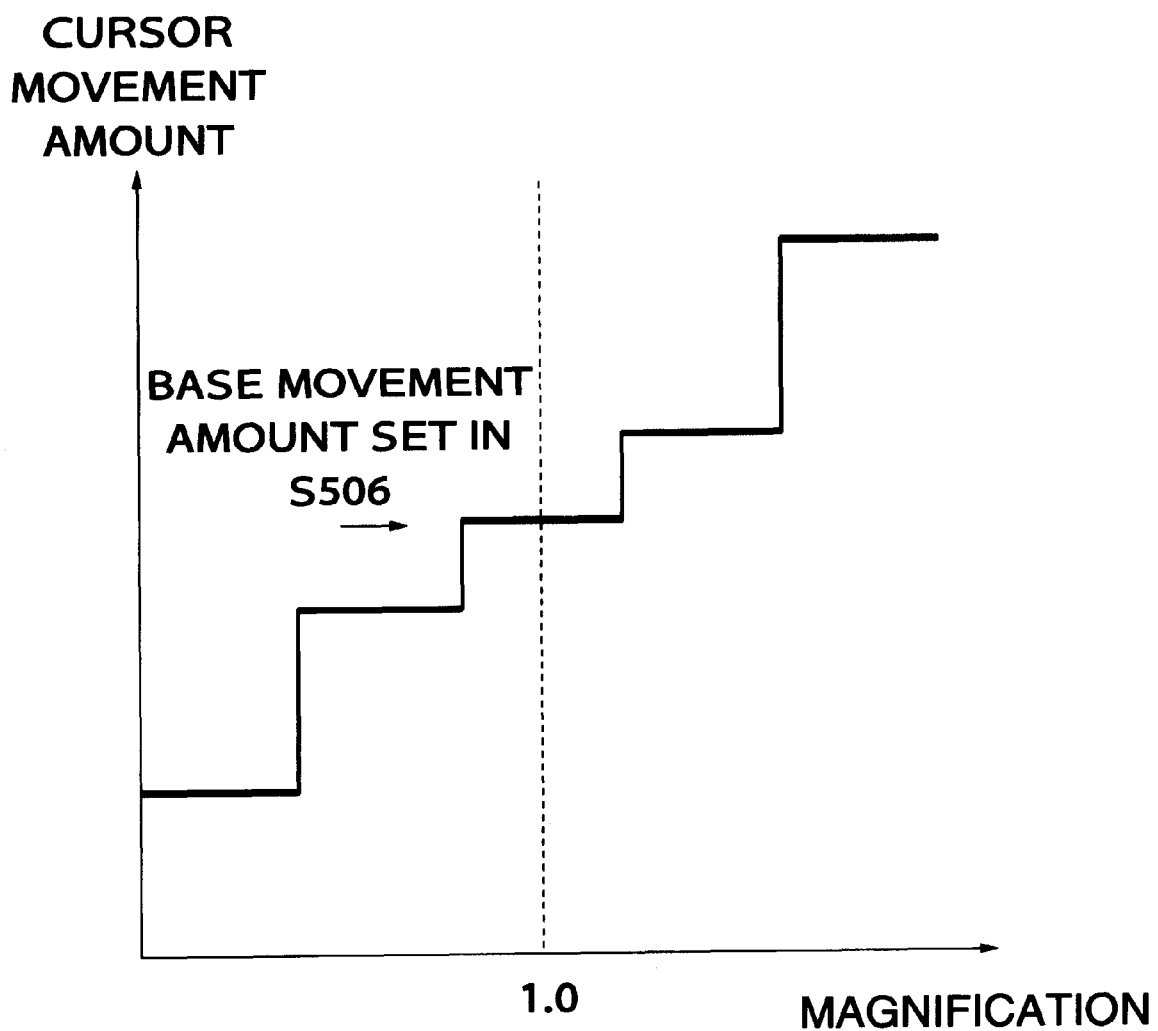
FIG. 14 is a view showing a cursor moving amount changing table for use in drawing a cursor for the exclusive use of ISDB.

Referring next to FIGS. 10 and 11, a description will be given of the integrated operation of the digital broadcasting for the ISDB. FIG. 10 is a view showing an example of a screen of the digital broadcasting for the ISDB; FIG. 11 is a view showing a process of drawing the ISDB cursor in the step S307 in FIG. 9; FIG. 12 is a layout conversion image of an ISDB image; FIG. 13 is a view showing a cursor size changing table for use in drawing the ISDB cursor; and FIG. 14 is a view showing a cursor movement amount changing table for use in drawing the ISDB cursor.

First, a description will be given of a method for producing a screen of the digital broadcasting for the ISDB.

The screen of the digital broadcasting for the ISDB is created as shown in FIG. 10. To display the intended screen, a broadcasting station transmits a background, a moving image, data, a menu button, and the like as objects in a multimedia language, such as MHEG-5. Each object has properties such as a position, a size, a button, a bit map and a text. The image display system of this invention generates the objects other than the moving image of an MPEG2 from the property information in the same manner as the OSD is generated. The moving image of the MPEG2 is regenerated using a system from the image decoding part 6 to the resolution conversion part 9*a* in FIG. 1, and a screen intended by the broadcasting station as shown in FIG. 10 can be created by composing the moving image by the output composition part 18 in the previously-described manner. In the regeneration, the resolution of the MPEG2 is converted into such a resolution as to reduce the image into a designated size. The above-mentioned sequence is an example wherein the image is expressed in a resolution intended by the broadcasting station.

If the ISDB screen is handled as one screen on the multi-screen in the multi-screen display system, the layout must be changed in a method described below with reference to FIG. 12.

When the ISDB screen is handled in the multi-screen display system according to the present invention, a screen 50 is displayed as one screen on the multi-screen in a display resolution intended by the broadcasting station. If the display resolution intended by the broadcasting station is X pixels in a horizontal pixel direction and Y lines in a vertical line direction, the screen 50 is expressed by coordinates (X, 0), (0, Y). If the user changes the layout to display the multi-screen, the layout must be converted into a designated size or the position of the layout must be changed. If the resolution is converted in such a manner that the screen is magnified by M (1>M>0) in the horizontal direction and by N (1>N>0) in the vertical direction, the screen 51 is changed to a screen 51. The coordinates thereof is (X', 0), (0, Y'). The conversion is expressed by the following equations (1) and (2):

$$X'=MX \quad (1)$$

$$Y'=NY \quad (2)$$

To change the position from the origin (0, 0) to an movement offset (Xm, Ym), the screen 51 moves to the position of a screen 52, and the coordinates thereof are changed to (X", 0), (0, Y"). The conversion is expressed by the following equations (3) and (4):

$$X''=X+MX \quad (3)$$

$$Y''=Y+NY \quad (4)$$

The layout coordinates are converted by converting the resolution and changing the position by the above equations (1)–(4) as follows:

$$X''=MX+Xm \quad (5)$$

$$Y''=NY+Ym \quad (6)$$

The positional information of the ISDB screen laid out according to the above equations (5) and (6) are converted into the display on the multi-screen to draw the cursor.

Referring next to FIG. 11, a detailed description will be given of the process in the step S307 in the integrated operation mode.

When the multi-screen control cursor is located in DTV regions (regions #2, 3 in FIG. 7), the ISDB cursor is drawn in the step S307 as stated above. To draw the ISDB cursor, it is determined first in a step S501 whether the ISDB cursor must be displayed or not as shown in FIG. 10. In this embodiment, an arrow cursor is used as the multi-screen control cursor as shown in FIG. 10. If the broadcasting station instructs the ISDB cursor to be displayed (e.g., an outline of a button region is framed by a specific color, and the entire button region is inverted in color), or if the type of the cursor is desired to be changed intentionally; it is determined that the ISDB cursor should be displayed. The process goes to a step S502 to cancel the display of the multi-screen control cursor. More specifically, the cursor composition enable signal S12 in FIG. 6 disables the composition of the multi-screen control cursor.

Then, the process goes to a step S503 to display the ISDB cursor. If a frame cursor is used, the positions and number of buttons are recognized from a scenario descriptive language (if there are a plurality of buttons, all the buttons are recognized), and a frame cursor is displayed for a default button.

As is the case with the OSD, a rectangular button frame is painted out in a specific color and the button is drawn on the painted button frame. The frame cursor is moved by setting on/off the drawing of the frame cursor for the recognized buttons in a predetermined order in connection with the button of the remote control 23.

If it is determined in the step S501 that there is no necessity of displaying the cursor for the ISDB, the process goes to a step S504 to set a cursor size. More specifically, the size of the ISDB button is determined first, and the size of the multi-screen control cursor for controlling the entire system is set so as to make it possible for the user to select a desired button without fail. If there is no necessity of changing the cursor size, the present cursor size is maintained.

A cursor color is set in a next step S505. This aims at making it easier for the user to recognize that the system is currently in an ISDB operation mode. Thus, a different color from that of the multi-screen control cursor is set. If there is no necessity of changing the color, the current color is maintained.

Then, the process goes to a step S506 to set a cursor movement amount. If it is more convenient to change the cursor movement amount on the ISDB screen in the normal multi-screen control, the cursor movement amount is changed. If there is no necessity of changing the cursor movement amount, the movement amount is maintained at a current value. In a next step S507, the position of the operation button is recorded. This aims at enabling the multi-screen control part 10 to recognize a scene changing timing when a button selecting action is taken by operating the remote control 23 in the case where the cursor is located in the button region on the ISDB screen.

To change the setting as described later, the setting in the above-mentioned steps S504 through S507 is referred to as the base setting of the ISDB cursor display.

Then, the process goes to a step S508 to determine whether to display the ISDB image by 1 magnification according to a layout proposed by the broadcasting station. When the image is displayed by 1 magnification, the process goes to a step S509, wherein the setting on the multi-screen is changed according to the above setting. If the image is not displayed by 1 magnification, it is determined that the user intentionally changes the layout to display the multi-screen. Then, the process goes to a step S510 to determine whether to convert the resolution. If the resolution is converted, the process goes to a step S511 to change the cursor size correspondingly to the ISDB screen with the converted resolution with reference to a cursor size changing table. As shown in FIG. 13, the cursor size changing table shows a relationship between the cursor size and the magnification. In this embodiment, the cursor size determined in the step S504 is regarded as a reference value with respect to 1 magnification. As is apparent from the table, the cursor size is gradually increased with the increase in the magnification.

In a next step S512, the cursor movement amount is changed suitably for the ISDB screen with the converted resolution. The cursor movement amount is changed with reference to a cursor movement amount changing table. As shown in FIG. 14, the cursor movement amount changing table shows a relationship between the cursor movement amount and the magnification. In this embodiment, the cursor movement amount shows a relationship between the cursor size and the magnification with the cursor movement amount set in the step S506 being a reference value with respect to 1 magnification. As is clear from the table, the cursor movement amount is gradually increased with the increase in the magnification.

Then, the process goes to a step S513 to change the memorized position of the operation button in accordance with the change in the layout by substituting (Xm, Ym)=(0, 0) for the offset coordinates in the equations (5) and (6). Then, the process goes to a step S514.

If it is determined in the step S510 that the resolution will not be converted, the process goes to a step S514 skipping through the step S511–S513. In the step S514, it is determined whether the position of the operation button is to be changed or not. If it is determined that the position of the operation button is to be changed, the process goes to a step S515 to again change the memorized position of the operation button according to the change in the layout by substituting M=N=0 for the magnifications in the above equations (5) and (6). Then, the steps goes to the step S509. If it is determined in the step S514 that the position of the operation button is not to be changed, the process goes to the step S509 skipping through the step S515.

When the user selects a button on the ISDB screen whose layout has been changed on the multi-screen to take an interactive action, the multi-screen control part 10 returns the changed position of the cursor from (X″, Y″) to (X, Y) intended by the broadcasting station in accordance with the following equations (7) and (8) obtained from the above equation (3):

$$X=(X''Xm)/M \quad (7)$$
$$Y=(Y''Ym)/N \quad (8)$$

The returned position and the region having the button properties are compared and monitored. If they correspond to one another, the action is regarded as the button selecting action. Accordingly, the corresponding button is selected. Therefore, the scenes can be changed properly on the multi-screen.

As stated above, when the multi-screen control cursor is located within the DTV display regions, this is automatically detected to change the type, size, color and movement amount of the cursor. This provides the optimum operational environment corresponding to the mode of the operation. Even when the layout of the multi-screen is changed, the selection of the interactive button can be recognized accurately to change the scenes properly. This realizes the integrated operation on the multi-screen that displays the DTV images for the ISDB.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A multi-screen display system comprising:

input means for inputting images from a plurality of image sources;

display means having a multi-screen capable of displaying the inputted images;

image source determining means for determining a type of each of said image sources;

layout determining means for determining a layout of display regions for arranging the inputted images on said multi-screen of said display means;

cursor control means for generating a multi-screen control cursor for inputting commands on said multi-screen and controlling operation thereof; and display region identifying means for identifying a display region on said multi-screen of said display means in which said multi-screen control cursor is positioned; and wherein said cursor control means determines a role of said multi-screen control cursor in the display region where said multi-screen control cursor is positioned according to a type of an image source of an image displayed in the display region, and said cursor control means controls generation of said multi-screen control cursor and the operation thereof so that said multi-screen control cursor can play the determined role.

2. A multi-screen display system as defined in claim 1, wherein said plurality of image sources includes at least one image source providing an interactive operational environment, and said cursor control means sets a role of said multi-screen control cursor corresponding to the interactive operational environment when an image source of an image displayed in the display region where said multi-screen control cursor is positioned provides the interactive operational environment.

3. A multi-screen display system as defined in claim 1, wherein said at least one image source providing said interactive operational environment has a cursor generation controlling function of generating a cursor on said at least one image source and controlling operation of said cursor, and said cursor control means has control transfer means operable if the image source of the image displayed in the display region where said multi-screen control cursor is positioned has said cursor generation controlling function, for transferring control relating to the generation and operation of said multi-screen control cursor to said cursor generation controlling function of said image source having said cursor generation controlling function so that said multi-screen control cursor is switched to said cursor generated by the image source having said cursor generation controlling function.

4. A multi-screen display system as defined in claim 3, wherein said image source having said cursor generation controlling function is an information processing apparatus including a personal computer and a workstation.

5. A multi-screen display system as defined in claim 3, wherein said image source having said cursor generation controlling function is provided with a serial bus, and said cursor control means has a serial bus connected to said serial bus of said image source;

said control transfer means reconstructs the connection of said serial bus of said cursor control means and said serial bus of said image source while said image source is operating, and then transfers the control relating to the generation and operation of said multi-screen control cursor to said cursor generation controlling function of said image source.

6. A multi-screen display system as defined in claim 5, wherein said serial bus of said image source and said serial bus of said cursor control means are universal serial buses or serial buses conforming to an IEEE 1394 standard.

7. A multi-screen display system as defined in claim 2, wherein said plurality of image sources includes at least one image source having a cursor generation controlling function of controlling said cursor control means to generate an interactive cursor for moving and changing exclusively interactive select buttons, and wherein if the image source of the image displayed in the display region where said multi-screen control cursor is positioned has said cursor generation controlling function, said cursor control means turns off a display of said multi-screen control cursor to generate said interactive cursor according to said cursor generation controlling function of said image source and controls operation of said interactive cursor.

8. A multi-screen display system as defined in claim 2, wherein said plurality of image sources includes at least one image source having a cursor generation controlling function of controlling said cursor control means to generate said multi-screen control cursor, and wherein if the image source of the image displayed in the display region where said multi-screen control cursor is positioned has said cursor generation controlling function, said cursor control means generates said multi-screen control cursor according to said cursor generation controlling function of said image source and changes size, color and movement amount of said multi-screen control cursor according to a resolution of said display region where said image of said image source having said cursor generation controlling function is displayed.

9. A multi-screen display system as defined in claim 7, wherein said image source having said cursor generation controlling function provides a digital broadcasting according to an integrated digital broadcasting system.

10. A multi-screen display system as defined in claim 8, wherein said image source having said cursor generation controlling function provides a digital broadcasting according to an integrated digital broadcasting system.

11. A multi-screen display system as defined in claim 9, wherein if said multi-screen control cursor on said multi-screen is located in a display region of said digital broadcasting according to said integrated digital broadcasting system, said cursor control means converts a position of said multi-screen control cursor to a position desired by a provider of said integrated digital broadcasting system, and wherein if the converted position of said multi-screen control cursor is within a region of a button property of changing interactive scenes, said cursor control means takes an action to change scenes according to a scenario of the digital broadcasting when received.

12. A multi-screen display system as defined in claim 10, wherein if said multi-screen control cursor on said multi-screen is located in a display region of said digital broadcasting according to said integrated digital broadcasting system, said cursor control means converts a position of said multi-screen control cursor to a position desired by a provider of said integrated digital broadcasting system, and wherein if the converted position of said multi-screen control cursor is within a region of a button property of changing interactive scenes, said cursor control means takes an action to change scenes according to a scenario of the digital broadcasting when received.

13. A multi-screen display method which comprises:

a receiving step of receiving images from a a plurality of image sources;

displaying the received images on a multi-screen of one display unit;

an image source type determining step of determining a type of each of said image sources;

a layout determining step of determining a layout of display regions, for arranging the received images on said multi-screen of said display unit;

a cursor generating step of generating a multi-screen control cursor for inputting commands on said multi-screen and operating said multi-screen control cursor;

a display region identifying step of identifying a display region on said multi-screen of said display means in which said multi-screen control cursor is positioned; and a cursor control step of determining a role of said multi-screen control cursor in the display region where said multi-screen control cursor is positioned according to a type of an image source of an image displayed in said display region, and controlling generation of said multi-screen control cursor and operation thereof so that said multi-screen control cursor can play the determined role.

14. A multi-screen display system as defined in claim 13, wherein said plurality of image sources includes at least one image source providing an interactive operational environment, and said cursor control step sets a role of said multi-screen control cursor corresponding to the interactive operational environment when an image source of an image displayed in the display region where said multi-screen control cursor is positioned provides the interactive operational environment.

15. A multi-screen display method as defined in claim 14, wherein said at least one image source providing said interactive operational environment has a cursor generation controlling function of generating a cursor on said at least one image source and controlling operation of said cursor, and wherein if the image source of the image displayed in the display region where said multi-screen control cursor is positioned has said cursor generation controlling function, said cursor control step transfers control relating to the generation and operation of said multi-screen control cursor to said cursor generation controlling function of said image source having said cursor generation controlling function so that said multi-screen control cursor is switched to said cursor generated by the image source having said cursor generation controlling function.

16. A multi-screen display method as defined in claim 15, wherein said image source having said cursor generation controlling function is an information processing apparatus including a personal computer and a workstation.

17. A multi-screen display method as defined in claim 16, wherein said image source having said cursor generation controlling function is provided with a serial bus, and said cursor control means has a serial bus connected to said serial bus of said image source, and wherein said cursor control step comprises reconstructing the connection of said serial bus of said cursor control means and said serial bus of said image source while said image source is operating, and then transferring the control relating to the generation and operation of said multi-screen control cursor to said cursor generation controlling function of said image source.

18. A multi-screen display method as defined in claim 17, wherein said serial bus of said image source and said serial bus of said cursor control means are universal serial buses or serial buses conforming to an IEEE 1394 standard.

19. A multi-screen display method as defined in claim 14, wherein said plurality of image sources includes at least one image source having a cursor generation controlling function of controlling said cursor control means to generate an interactive cursor for moving and changing exclusively interactive select buttons, and wherein if the image source of the image displayed in the display region where said multi-screen control cursor is positioned has said cursor generation controlling function, said cursor control step turns off a display of said multi-screen control cursor to generate said interactive cursor according to said cursor generation controlling function of said image source and controls operation of said interactive cursor.

20. A multi-screen display method as defined in claim 14, wherein said plurality of image sources includes at least one image source having a cursor generation controlling function of controlling said cursor control means to generate said multi-screen control cursor, and wherein if the image source of the image displayed in the display region where said multi-screen control cursor is positioned has said cursor generation controlling function, said cursor control step generates said multi-screen control cursor according to said cursor generation controlling function of said image source and changes size, color and movement amount of said multi-screen control cursor according to a resolution of said display region where said image of said image source having said cursor generation controlling function is displayed.

21. A multi-screen display system as defined in claim 19, wherein said image source having said cursor generation controlling function provides a digital broadcasting according to an integrated digital broadcasting system.

22. A multi-screen display method as defined in claim 20, wherein said image source having said cursor generation controlling function provides a digital broadcasting according to an integrated digital broadcasting system.

23. A multi-screen display method as defined in claim 21, wherein if said multi-screen control cursor on said multi-screen is located in a display region of said digital broadcasting according to said integrated digital broadcasting system, said cursor control step converts a position of said multi-screen control cursor to a position desired by a provider of said integrated digital broadcasting system, and wherein if the converted position of said multi-screen control cursor is within a region of a button property of changing interactive scenes, said cursor control step takes an action to change scenes according to a scenario of the digital broadcasting when received.

24. A multi-screen display method as defined in claim 22, wherein if said multi-screen control cursor on said multi-screen is located in a display region of said digital broadcasting according to said integrated digital broadcasting system, said cursor control step converts a position of said multi-screen control cursor to a position desired by a provider of said integrated digital broadcasting system, and wherein if the converted position of said multi-screen control cursor is within a region of a button property of changing interactive scenes, said cursor control step takes an action to change scenes according to a scenario of the digital broadcasting when received.

* * * * *